June 8 1965 J. H. BERGEN 3,187,492
LAWN MOWER BEDKNIFE ADJUSTMENT
Filed Aug. 31, 1962
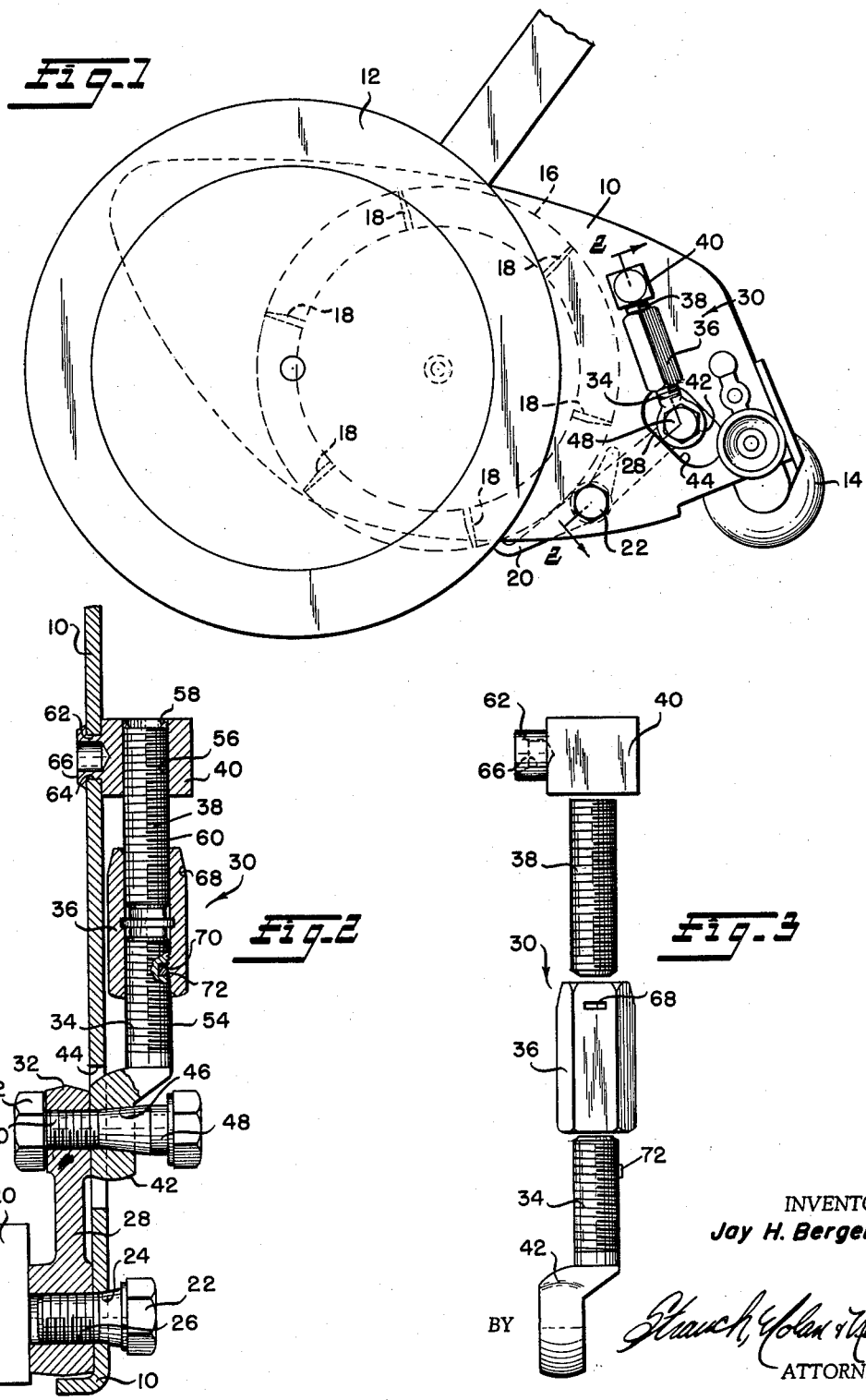
INVENTOR
Jay H. Bergen
BY
ATTORNEYS United States Patent Office 3,187,492
Patented June 8, 1965

3,187,492
LAWN MOWER BEDKNIFE ADJUSTMENT
Jay H. Bergen, Warwick, R.I., assignor to The O. M. Scott and Sons, Marysville, Ohio, a corporation of Ohio
Filed Aug. 31, 1962, Ser. No. 220,630
5 Claims. (Cl. 56—249)

This invention relates to lawn mower cutter mechanism and more particularly pertains to means for adjusting the angular position of the bedknife with respect to cooperating revolving helical blades of a reel type lawn mower.

The bedknife adjustment is accomplished by turnbuckle linkage and can be of advantage in nearly all forms of reel mowers to provide an easier, more accurate method for adjusting a bedknife relative to the reel blades. Desirably, mower reel blades are accurately ground and sharpened so that when they are revolved, the edges of the helical cutting blades travel in an accurate cylindrical path, and the function of the bedknife, which does not rotate and is straight and preferably non-flexible, is to accomplish a scissor relationship with the sharp edges of helical cutting blades.

The present invention was developed in connection with a reel hand mower of the so called "silent" type, in which the bedknife is adjusted so that a very minute clearance is maintained. However, it is also applicable for use in many mowers where the adjustment of the bedknife enables a "kissing" or wiping contact between the helical blades and the bedknife. The precision and uniformity of either the minute clearance of silent blades or "kissing" of wiping blades is a very important factor in the cutting action of this type of lawn mower. It is also of importance in its effect upon the maintenance of long mower life, sharpness of the reel blade edges and the bedknife and in the ease of operation of the mower. In all mowers, except those of the silent type, where the bedknife and reel blades actually kiss with resultant friction in their coaction, tolerances of course need not be quite as close as are required in the silent mowers in which the spaced distance between the bedknife and the passing reel blades must be less than the thickness of a blade of grass all the way across the reel. Improper adjustment can either enable too great a contact between the bedknife and reel blades or too great clearance. All kissing of blades is undesirable in the case of silent mowers because when the blades contact the bedknife they are often quickly dulled, the accurate shape of the cutting edges is rapidly destroyed and it is only with difficulty that the blades can again be made into an accurate, cooperating scissor cutting structure. On the other hand, if the clearances are too great, the grass blades will never be sheared and may be torn which results in a browned appearance of the lawn. In a satisfactory silent type mower, clearances between the bedknife and the reel blades must be between .002 to .004 inch.

In using adjustment mechanism on a bedknife where the relationship between the bedknife and the reel blades must first be adjusted and second, must be locked or clamped (the type of adjustment used on most lawn mowers) the mere locking of the adjustment mechanism can change the tolerances of clearance an amount sufficient to destroy an even kissing action or an amount which can completely throw a silent mower out of proper adjustment.

In the commonly known types of previously used bedknife adjustment mechanisms, separate screw members or dual nuts, one of them a locking nut, are employed. In both of the screw and nut adjustments, one of the elements is used to urge the bedknife toward the reel blades and another to urge it away. Each of the elements, when tightened, places the intervening linkages under stress and/or strain in order to lock or retain the adjustment. However, the final adjusted position of the bedknife will change, even if only slightly, due first, to the elasticity of the nuts or screw components and second, to the fact that the effect of the adjustment forces depends both upon which of the adjusting components are tightened first and the degree of tightness to which both elements are tightened. Such previously known adjustments require time consuming trial and error adjustments to obtain the proper correlation between the bedknife and the reel blades. A further disadvantage is that an average operator often can do more harm to the blades than good.

The present invention utilizes a turnbuckle type of adjustment linkage on each end of the bedknife which insofar as is known is novel. In addition, a small elastic plastic (nylon) friction lock is included inside of each turnbuckle assembly so that the adjustment linkage needs no separate locking steps. In other words, the turnbuckle nut is manipulated to obtain accurate minute adjustments of each end of the bedknife and then left in the desired position with no additional locking force applied. This makes possible much more accurate minute adjustments and saves considerable time for the user as well as in original production of the mower because of ease and rapidity in arriving at a proper clearance.

Accordingly, a primary object of the invention resides in the provision of a lawn mower bedknife adjusting means of novel simplified construction which is easily manipulated into desired adjusted position, no further steps being necessary to lock that obtained adjustment.

A further object resides in providing a novel lawn mower bedknife adjustment mechanism in which a rigid pivotally mounted bedknife is held in cutting relationship with a cutting reel by means of turnbuckle adjustment linkages at the pivoted ends of the bedknife.

Still another object resides in the provision of a novel lawn mower bedknife adjustment mechanism in which each end of the bedknife is pivoted to and includes a lever arm connected to the frame of the mower through a turnbuckle adjustment linkage, each turnbuckle linkage including in its internal threaded connections an elastic locking pellet.

A still further object resides in the provision of a novel turnbuckle linkage in which an elastic pellet is retained in one of the turnbuckle components and is deformed against the threads of a mating turnbuckle component.

Further novel features and objects of this invention will become apparent from the following detailed description and the appended claims taken in conjunction with the accompanying drawings showing a preferred embodiment thereof, in which:

FIGURE 1 is a side elevation of the lawn mower, the handle being deleted, showing a bedknife adjustment mechanism in accord with the present invention;

FIGURE 2 is an enlarged section view taken on line 2—2 of FIGURE 1 and illustrates internal details of one of the turnbuckle linkages for bedknife adjustment; and FIGURE 3 is an enlarged preassembled view illustrating the four components of the turnbuckle linkage.

FIGURE 1 represents a reel type hand operated lawn mower in which the cutting reel is propelled by the drive wheels. This construction consists of a frame including rigid side plates 10 upon which are supported the rotatable drive wheels 12. The two side plates 10 of the mower extend rearwardly to a position where a trailing edge roller 14 is mounted to extend between the plates. Thus, the mower frame is supported by the two drive wheels 12 and the trailing roller 14. Intermediate the drive wheels 12 and roller 14 there is mounted a cutting reel 16, shown in dotted lines, which is driven through gearing (not shown) by rotation of the drive wheels 12 according to conventional practice. The cutting reel 16, as is conventional, consists of a plurality of spiders and/or end disks which rigidly mount helical cutting blades 18, the cutting edges of which rotate in a cylindrical path, and provide a cooperative scissor action with the front upper edge portion of a bedknife 20, the latter being adjustably mounted between the two side plates 10 in front of the roller 14, as will be described hereinafter in detail.

The two side plates 10 of the mower frame pivotally support the bedknife 20 by means of a cap screw 22 at each end of the bedknife. Each cap screw 22 passes through a slightly tapered opening 24 in its associated side frame 10 and is rigidly fastened by its threaded end into a tapped bore 26 in the lower end of an associated bedknife adjustment arm 28. There is an adjustment arm 28 extending rearwardly from each end of the bedknife and the lower ends of arms 28 are welded in a rigidly fixed relationship to the bedknife. It will be noted that the shank portion of the cap screw 22 near its head is tapered to effect a close wedging engagement between the cap screw and its associated tapered hole 24 in side plates 10. This structural relationship provides an accurate location of the end pivots of the bedknife relative to the mower frame and prevents any shift or play of the bedknife radially or axially relative to or along the pivot axis while still permitting the bedknife to be pivoted.

A turnbuckle linkage 30 connects between the rear ends 32 of each bedknife adjustment arm 28 and the side plate 10. Viewing FIGURE 3, it will be seen that the turnbuckle linkage 30 consists of four elements, a lower eye bolt 34, the turnbuckle nut 36, an upper threaded stud 38 and top mounting trunnion 40.

Clearly shown in both of FIGURES 2 and 3, the head 42 of eye bolt 34 is offset to project into the plane of side plate 10 through an elongated aperture 44 (see FIGURE 1). The aperture 46 through the eye bolt head 42 is tapered to fit the taper of the shank portion of a cap screw 48 threaded at 50 into the rear end 32 of the associated bedknife adjusting arm 28. A lock nut 52 is tightened on the projecting end of cap screw 48 to lock it in a snug position firmly securing the side face of the head 42 of eye bolt 34 against the side face of the rear end 32 of bedknife adjustment arm 28, yet not preventing a relative pivoting movement during adjustment.

The shank of eye bolt 34 is threaded and, as shown in the illustrated embodiment in FIGURE 2, has a left hand thread and projects into the lower end of the turnbuckle nut 36. The upper stud 38 is threaded into the bore 56 of trunnion 40 and rigidly fixed therein as by welding 58 between the end of stud 38 and trunnion 40. If desired, the stud 38 can be made structurally integral with trunnion 40. The threads 60 on upper stud 38 are the same pitch but of opposite hand to the threads on the eye bolt 34, i.e., in the illustrated embodiment, they are right hand threads. Prior to assembly of trunnion 40 on the mower side plate 10, the trunnion 40 appears as shown in FIGURE 3 with a short sleeve shaped stud 62 extending from one side face. As shown in FIGURE 2 the trunnion stud 62 projects through a pivot hole 64 in the associated side plate 10 and is swaged over at 66 to firmly but pivotably secure the trunnion 40 to its associated side plate 10.

The turnbuckle nut 36 is threaded on the lower end of stud 38 so that, in assembly, see FIGURE 2, the eye bolt 34 and stud 38 extend substantially equal distances into opposite ends of the turnbuckle nut 36. In conventional turnbuckle manner, upon rotation of the turnbuckle nut 36, the turnbuckle linkage 30 will be shortened or lengthened. Accordingly, by adjusting the nut 36, the rear end 32 of the associated bedknife adjusting lever 28 can be swung up or down for pivoting the bedknife 20, on its cap screw pivots 22, relative to the side plates of the mower. This adjustment respectively lowers or raises the forward cutting edge of bedknife 20 relative to the reel blades.

If desired, one or more of the hexagonal side faces of turnbuckle nut 36 may be provided adjacent the upper end with an impact indentation 68 which will provide a self-locking function on the threads of the upper stud 38. The use of similar impact indentations in nuts to provide a self-locking aspect between a nut and bolt is well-known. The indentation is normally accomplished subsequent to formation of the nut threads and results in slight deformation of the material from which the nut is made in a finite locale of the threads. The thread deformation in turn results in increased friction between the cooperating nut and bolt threads and thereby serves to maintain the nut in adjusted position. Examples of indentations in self locking nuts may be seen in United States Patent Nos. 2,352,668, 2,519,417 and 3,029,856, the latter specifically illustrating side indentations.

Seen in FIGURE 2, a recess 70 near the upper threaded end of eye bolt 34 receives a deformable elastic pellet 72 which projects radially a slight distance beyond the bolt threads. The pellet 72 is preferably made of a plastic material such as nylon and, in the assembled turnbuckle shown in FIGURE 2, extends into the configuration of the internal threads at the lower end of turnbuckle nut 36 for engaging such threads with considerable friction. The frictional engagement provided by the plastic pellet 72 between the threads of the nut and the eye bolt, functions as a locking means to prevent undesired rotation of the turnbuckle nut 36 once an intentional adjustment is accomplished. It is to be understood that the pellet 72 could be located in a recess in any of the three threaded turnbuckle members 34, 36 or 38.

It has been found preferable to make the bedknife adjustment for this type of lawn mower just as simple and convenient as possible. As has been hereinbefore described, adjustment of the mower bedknife 20 can be accomplished solely through adjustment of the single turnbuckle nut 36 at each side of the mower. One merely has to turn the turnbuckle nut 36 in small increments while checking rotation of the reel until the proper relationship between the reel knives 18 and the bedknife 20 is accomplished. The turnbuckle nut is then left just as it is, no further clamping or tightening action being necessary.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A lawn mower having a frame, a cutting reel rotatably mounted on said frame, a bedknife and means mounting said bedknife on said frame for movement into and away from a position for scissor cutting cooperation with said cutting reel, said mounting means comprising: a single turnbuckle adjustment linkage provided at each end of said bedknife and connected between associated ends of said bedknife and said frame for adjustably positioning said knife with respect to said frame and said reel, each said turnbuckle adjustment linkage comprising plural interconnecting components including deformable elastic means frictionally cooperating between engaging other ones of said turnbuckle components for locking said turnbuckle linkage against unintended adjustments thereof.

2. a lawn mower combination comprising: a rigid frame including transversely spaced side members and means interconnecting said side members to provide a rigid structure; a bedknife device extending transversely between said side members and connected to said frame; a cutting reel rotatably mounted in said frame on an axis transversely extending between said side members and disposed above and cooperating with said bedknife; and adjusting means interconnected between said bedknife and said frame, including a single turnbuckle linkage, including self-locking means, connected between each end of said bedknife and an associated frame side member for positioning said bedknife with respect to said reel; said turnbuckle linkage comprising components including two oppositely threaded links and a turnbuckle nut threadedly interconnecting said links; and said self-locking means is included in one of said turnbuckle linkage components and provided components of frictional engagement against cooperating threads of another one of said components sufficiently higher than the friction of normal threaded engagement to tend to maintain the turnbuckle linkage in adjusted condition.

3. A lawn mower combination comprising: a rigid frame including transversely spaced side members and means interconnecting said side members to provide a rigid structure; a bedknife device extending transversely between said side members and connected to said frame; a cutting reel rotatably mounted in said frame on an axis transversely extending between said side members and disposed above and cooperating with said bedknife; and adjusting means interconnected between said bedknife and said frame, including a single turnbuckle linkage connected between each end of said bedknife and an associated frame side member for positioning said bedknife with respect to said reel; said turnbuckle linkage having a self-locking means and comprising components including two oppositely threaded links and a turnbuckle nut interconnecting said links, said self-locking means comprising deformable elastic material fixed in one of said turnbuckle components and frictionally engaging the threads of another of said turnbuckle components.

4. A mower according to claim 3, wherein a recess is provided in the threaded portion of one of said links which projects into said nut, and said elastic material comprises a plastic pellet fitted into said recess and deformed against the internal threads of said nut.

5. A lawn mower bedknife adjustment assembly comprising: a mower side frame having an aperture therein; a bedknife device including a bedknife and an adjustment arm rigid on an end of said bedknife; a pivot member on said bedknife device extending through said side frame aperture and pivotally securing said bedknife to said side frame; and a single turnbuckle linkage provided for said pivoted end of said bedknife; said turnbuckle linkage comprising at least three threaded cooperating components, a deformable elastic material fixed in one of said cooperating components and frictionally engaging a second of said cooperating components, a first one of said components being a link pivotally secured on said side frame and a second one of said components being a link pivotally secured to the extended end of said bedknife adjustment arm, and said first and second turnbuckle linkage components being shiftable relative to each other upon operative adjustment manipulation of said third component for adjustably maintaining a desired position of said bedknife device.

References Cited by the Examiner

UNITED STATES PATENTS

| | | | |
|---|---|---|---|
| 2,270,584 | 1/42 | Funk | 56—289 |
| 2,533,894 | 12/50 | Podell | 287—60 |
| 2,896,390 | 7/59 | Cunningham | 56—249 |

T. GRAHAM CRAVER, *Primary Examiner.*

RUSSELL R. KINSEY, *Examiner.*